US005365395A

United States Patent [19]

Callaway

[11] Patent Number: 5,365,395

[45] Date of Patent: Nov. 15, 1994

[54] FUSE BLOCK PROTECTOR

[75] Inventor: Jerry Callaway, Novato, Calif.

[73] Assignee: Panamax, Inc., San Rafael, Calif.

[21] Appl. No.: 970,017

[22] Filed: Nov. 2, 1992

[51] Int. Cl.[5] .................. H02H 9/06

[52] U.S. Cl. .................. 361/56; 361/104

[58] Field of Search .................. 361/56, 104, 111, 58; 439/621, 622

[56] References Cited

U.S. PATENT DOCUMENTS

| | | | |
|---|---|---|---|
| 3,693,053 | 9/1972 | Anderson | 317/231 |
| 4,152,743 | 5/1979 | Comstock | 361/56 |
| 4,168,514 | 9/1979 | Howell | 361/56 |
| 4,547,827 | 10/1985 | Shedd | 361/55 |
| 4,739,436 | 4/1988 | Stefani et al. | 361/56 |
| 4,760,485 | 7/1988 | Ari et al. | 361/54 |
| 4,807,083 | 2/1989 | Austin | 361/111 |
| 4,968,264 | 11/1990 | Ruehl et al. | 439/622 |
| 5,089,925 | 2/1992 | Hilland | 361/56 |
| 5,130,881 | 7/1992 | Hilland | 361/56 |

*Primary Examiner*—Todd E. DeBoer

*Attorney, Agent, or Firm*—Limbach & Limbach

[57] ABSTRACT

A fuse block includes a body having a front face and a flat rear face. A plurality of terminal lugs mounted are on the front face, and a plurality of fuse clips are each connected to one of the terminal lugs. The terminal lugs and fuse clips are arranged in a plurality of pairs, each pair being positioned to receive a fuse. A plate receives the fuse block. The plate includes a front face and a rear face. The front face of the plate is flat and adapted to couple with the rear face of the fuse block. A plurality of metal straps are each affixed to the rear face of the plate and extend from the plate for termination into respective ones of each terminal lug pair. A single metal strap is also affixed to the rear face of the plate and extends from the plate for receiving a single terminal lug and a grounding wire. A plurality of metal oxide varistors are each connected between unique respective ones of the metal straps. A base has a sufficient depth for receiving the rear face of the insulating plate and the MOV's mounted thereon and the fuse block.

7 Claims, 2 Drawing Sheets

FUSE BLOCK PROTECTOR

FIELD OF THE INVENTION

The present invention relates to electrical protection devices, and more particularly, to an improved method and apparatus for providing overvoltage and overcurrent protection in power supply lines.

BACKGROUND

Alternating current ("AC") is commonly used to provide power to machines and appliances for industrial, commercial, and residential customers. Overcurrent protection is required for most installations, and industry standards provide guidelines for wire sizing and fuse rating. See National Electrical Code, Article 240. Fuses are held in place by "fuse blocks." A typical fuse block comprises a flat insulating body that is suitable for direct mounting via the rear surface inside a motor control panel or other electrical enclosure. A pair of terminal lugs are positioned on opposite ends of the body, and each lug has a fuse clip physically and electrically connected thereto. A conductor is connected to each of the terminal lugs, and a cartridge-type fuse is inserted into the clips to complete the circuit.

While fuses are generally effective protection against overcurrent conditions, certain transient voltage surges can occur so fast that the fuse fails to protect the connected device. It is known that a metal oxide varistor ("MOV") has an excellent voltage limiting characteristic and a very fast response time. Therefore, protection devices have been built that utilize an MOV to provide voltage surge protection. See, for example, U.S. Pat. No. 3,693,053 (Anderson) and U.S. Pat. No. 4,547,827 (Shedd).

However, while Anderson and Shedd teach ways to use MOV's to provide overvoltage protection, they do not teach a way to conveniently retrofit existing fuse blocks to add overvoltage protection. Further, it would be desirable to provide such protection at low cost and with minimal disruption of equipment operation.

SUMMARY OF THE INVENTION

A method and apparatus for providing overcurrent and overvoltage protection to equipment which is powered by a first plurality of conductors is disclosed. The apparatus includes a fuse block, an insulating plate, and a cover. The method involves removing a previously installed fuse block and attaching the insulating plate and base, then reinstalling the completed assembly.

The fuse block includes a body having a front face and a flat rear face. Terminal lugs are mounted on the front face, and fuse clips are connected to each of the terminal lugs. The terminal lugs and fuse clips are arranged in pairs, each pair being positioned to receive a fuse.

The plate includes a front face and a rear face. The front face of the plate is flat and adapted to couple with the rear :face of the fuse block. Metal straps are affixed to the rear face of the plate and extend forward from the plate to the fuse block for termination into one set of terminal lugs. Another metal strap is affixed to the rear face of the plate and extends outward from the plate for connection to a single terminal lug and a grounding wire. Metal oxide varistors are connected between the metal straps to provide overvoltage protection.

The cover has a sufficient depth for receiving the rear face of the insulating plate and the MOV's mounted thereon and the fuse block.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
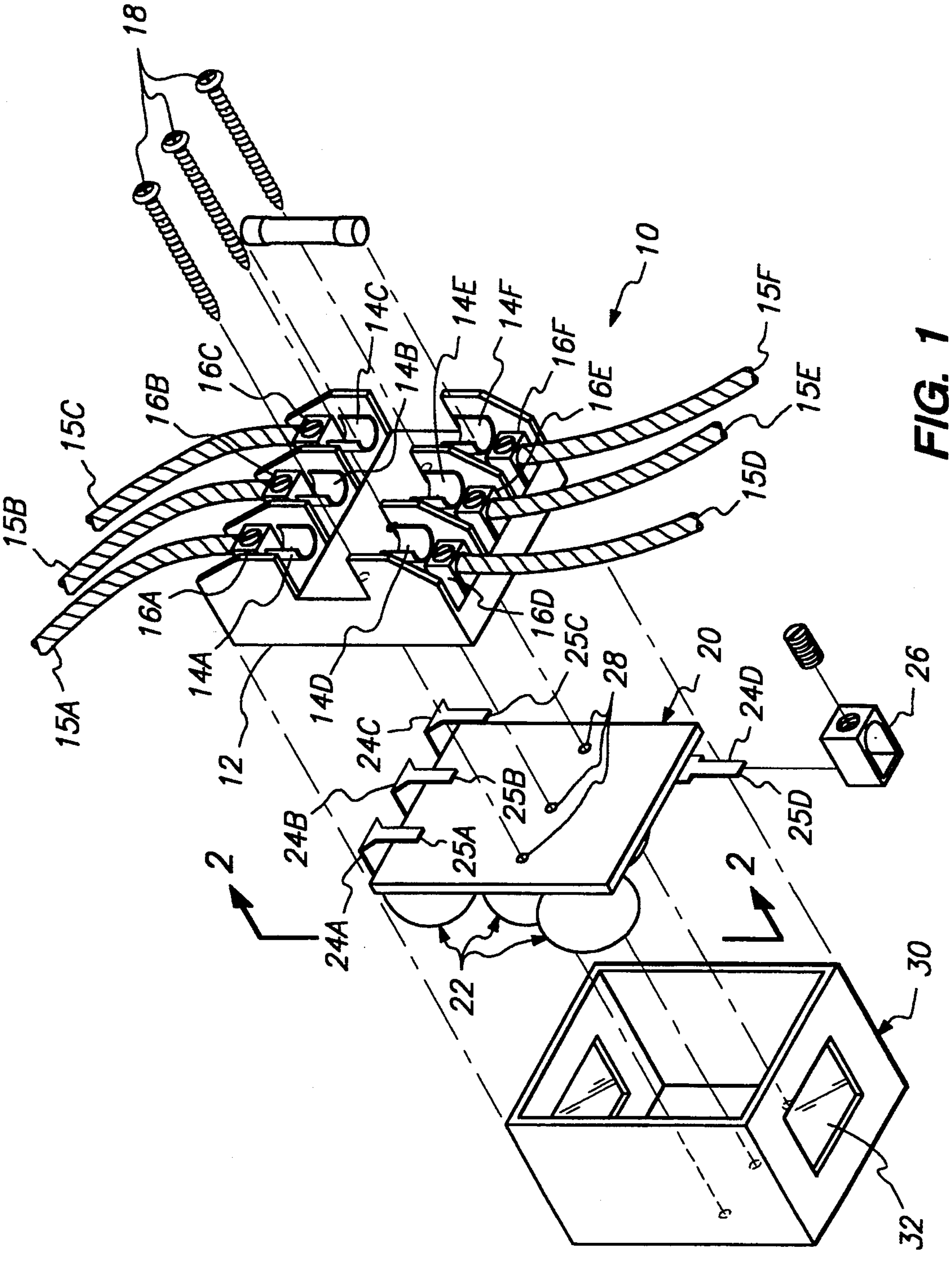
FIG. 1 is an exploded perspective view of a fuse block apparatus according to the present invention.

Referring now to FIG. 1, a conventional three phase fuse block 10 comprises an insulating body 12 having fuse clips 14A–F attached to terminal lugs 16A–F on the front face of the insulating body 12. The rear face of the insulating body 12 is flat to facilitate mounting the fuse block 10 via center mounted screws 18 inside a conventional electrical enclosure (not shown). Appropriate input conductors 15A, 15B and 15C are terminated into the terminal lugs properly sized cartridge-type fuses are snap-fit into the fuse blocks 14A–F to complete the circuit and to provide overcurrent protection to the equipment which is supplied three phase power by the conductors 15D–F.

According to the present invention, the fuse block 10 is easily removed from the enclosure and a plate 20 containing surge supppression circuitry and cover 30 are attached to the fuse block 10. The entire assembly is then reattached to the enclosure via screws 18. It is recognized that longer mounting screws 18 may be required. Of course, it is recognized that the plate 20 containing the surge suppression circuitry could be affixed as an integral part of the rear face of the insulating body 12 during the initial manufacture of the fuse block 10.

The plate 20 and cover 30 are both constructed from an insulating material such as a high-density plastic molded resin. A plurality of metal oxide varistors ("MOV's") 22 are mounted on the rear face of the plate 12. The plate 20 has three metal straps 24A, 24B, 24C, preferably made from copper, and each having tabs 25A, 25B and 25C extending from the rear thereof and adapted to fit into terminal lugs 16A, 16B, 16C, respectively, of the fuse holder 10 together with conductors 15A, 15B, 15C, respectively. A fourth metal strap 24D has a tab 25D extending from the rear of the insulating plate 20. A terminal lug 26 screw mounts onto tab 25D for receiving a ground wire (not shown). Three center holes 28 are positioned in correspondence with the center holes of the fuse block 10 to receive the screws 18.

A cover 30 is adapted to receive the fuse block 10 and the plate 20 for remounting onto the electrical enclosure. The cover 30 has a sufficient depth to enclose and protect the MOV's 22. Advantageously, the base 30 has windows 32 for inspecting the MOV's 22. The rear face of the cover 30 is flat to facilitate mounting on the electrical enclosure in the same manner as the fuse block was previously.

Figure 3:
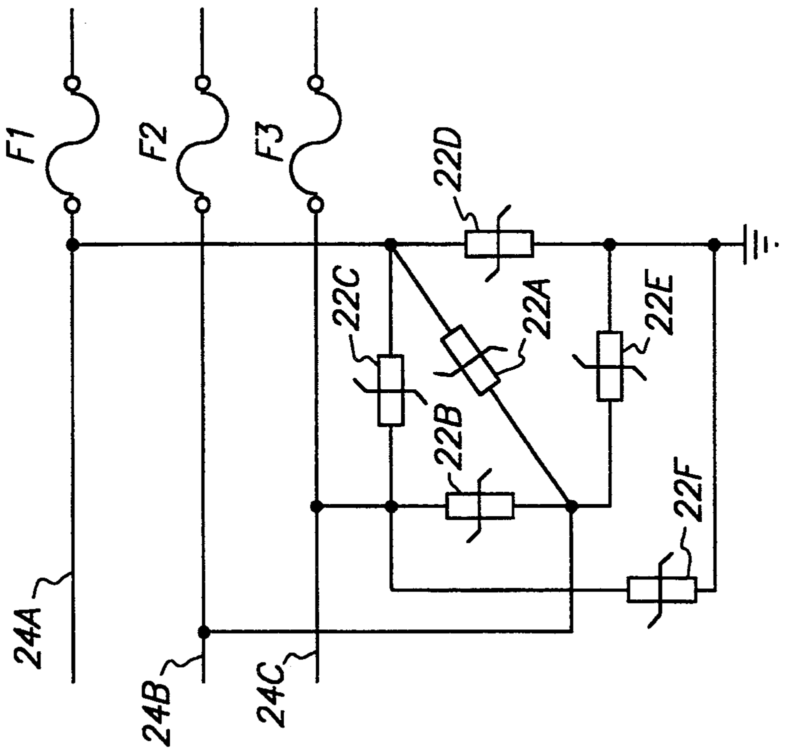
FIG. 3 PRIOR ART
FIG. 3 is a schematic circuit diagram of the present invention.
Figure 2:
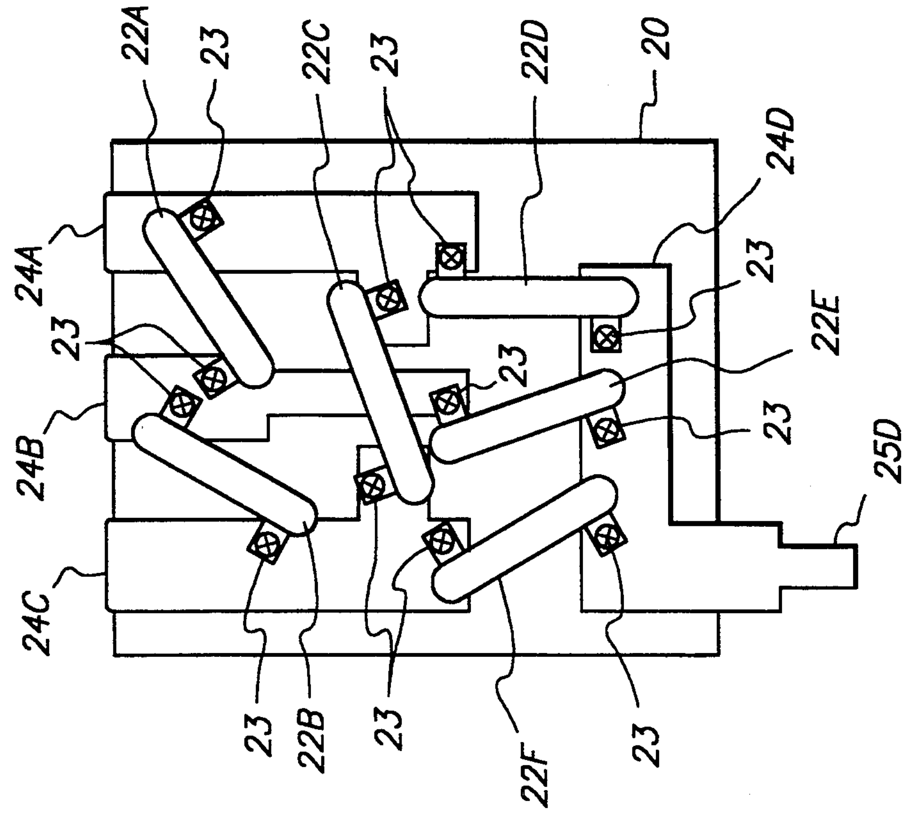
FIG. 2 is a view of a portion of the apparatus of the present invention as viewed in the direction of arrows 2—2 of FIG. 1.

The arrangement of the MOV's 22 on the rear face of insulating plate 20 is illustrated in FIG. 2, and the circuit equivalent thereof is illustrated in FIG. 3. Each of the metal straps 24A, 24B, 24C, 24D is independently affixed by screws 23 to the rear of the insulating plate 20 and each is isolated from the others. A first MOV 22A is connected between metal strap 24A and metal strap 24B. A second MOV 22B is connected between metal strap 24B and metal strap 24C. A third MOV 22C is connected between metal strap 24A and metal strap 24C. A fourth MOV 22D is connected between metal strap 24A and metal strap 24D. A fifth MOV 22E is connected between metal strap 24B and metal strap 24D. A sixth MOV 22F is connected between metal strap 24C and metal strap 24D. The MOV's 22 provide overvoltage protection between each leg and ground and between each of the legs.

It is recognized that different numbers of phases or multiple single-phase circuits could be easily upgraded to include voltage surge protection according to the present invention, and such obvious variants are clearly within the scope of the invention. The invention is not intended to be limited by the specifics of the above-described embodiment, but rather defined by the accompanying claims.

I claim:

1. A retrofit device for adding overvoltage protection to a fuse block having a plurality of terminal lugs affixed in pairs to one face of a flat insulating plate, the apparatus comprising:

a flat mounting plate separate from the fuse block and having a front face and a rear face;

a plurality of conductive straps each affixed to the rear face of the mounting plate and electrically isolated from each other, each conductive strap having a portion thereof extending from the rear face to the front face of the mounting plate for electrically connecting the strap to a terminal lug of the fuse block;

a grounding strap affixed to the rear face of the mounting plate and electrically isolated from the conductive straps, the grounding strap including means extending from the rear face of the mounting plate for receiving a grounding wire; and an overvoltage protection circuit coupled to the conductive and grounding straps on the rear face of the mounting plate.

2. A device as recited in claim 1 wherein the overvoltage protection circuit includes a plurality of metal oxide varistors coupled to the conductive and grounding straps and forming an overvoltage protection circuit among the straps and ground.

3. An apparatus for providing overcurrent and overvoltage protection comprising:

a fuse block having a front and a rear, comprising a plurality of terminal lugs and associated fuse clips arranged in pairs on the front of the fuse block, each pair having a top terminal lug adapted to receive an input wire, a bottom terminal lug adapted to receive an output wire, a top fuse clip coupled to the top terminal lug and a bottom fuse clip coupled to the bottom terminal lug, said top and bottom fuse clips adapted to receive a fuse therebetween;

a plurality of conductive straps mounted on the rear of the fuse block, each strap being electrically coupled with respective ones of said top terminal lug and associated fuse clip;

a grounding strap mounted on the rear of the fuse block and including means for receiving a grounding wire;

an overvoltage protection circuit coupled to the conductive and grounding straps on the rear of the fuse block.

4. An apparatus as recited in claim 3 wherein the overvoltage protection circuit includes a plurality of metal oxide varistors coupled to the conductive and grounding straps and forming an overvoltage protection circuit among the straps and ground.

5. An apparatus for providing overcurrent and overvoltage protection comprising:

a fuse block including a plurality of terminal lugs and associated fuse clips, said terminal lugs and fuse clips being arranged in pairs, each pair adapted to receive a fuse and input and output wires;

a device including a mounting plate positioned adjacent the fuse block, a plurality of conductive straps each affixed to the mounting plate and having tabs extending outward and connected to each pair of terminal lugs, a grounding strap affixed to the mounting plate and including means for receiving a grounding wire, and an overvoltage protection circuit coupled to the conductive and grounding straps.

6. An apparatus as recited in claim 5 further comprising a cover enclosing the overvoltage protection circuit.

7. A method for retrofitting overvoltage protection to a fuse block, wherein the fuse block includes a plurality of terminal lugs mounted on a front face thereof and wherein the fuse block is mounted in an enclosure, the method comprising the steps of:

providing a retrofit device that includes a mounting plate, a plurality of conductive straps each affixed to one side of the mounting plate and each having tabs extending outwardly for connection to the terminal lugs of the fuse block, a grounding strap affixed to the one side of the mounting plate and including means for receiving a grounding wire, and an overvoltage protection circuit coupled to the conductive and grounding straps;

removing the fuse block from the enclosure; coupling the retrofit device to a rear face of the fuse block by connecting the tabs to corresponding terminal lugs and a grounding wire to the grounding strap; and reattaching the fuse block and retrofit device to the enclosure.

* * * * *